Figure 1:
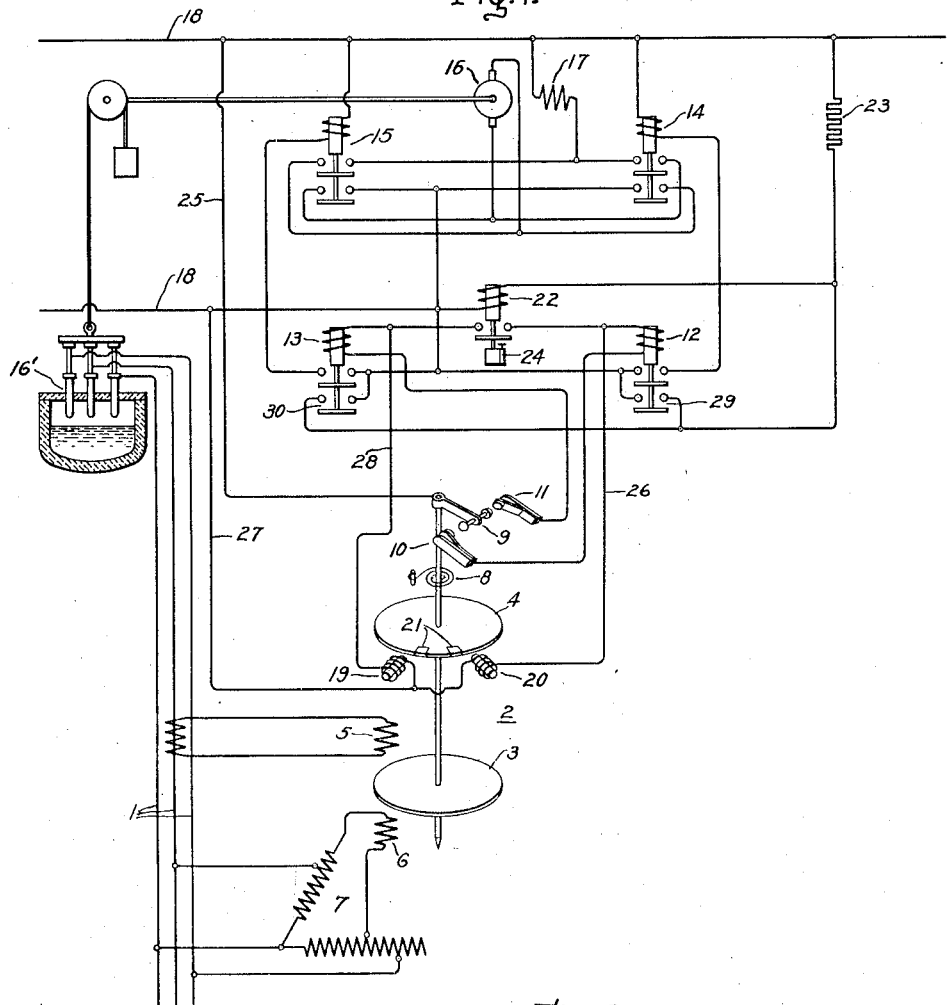

June 20, 1933.　　　　G. H. JUMP　　　　1,915,095

REGULATING SYSTEM

Filed Feb. 11, 1932　　　2 Sheets-Sheet 1

Inventor:
George H. Jump,
by *Chas. V. Tullar*
His Attorney.

June 20, 1933.    G. H. JUMP    1,915,095
REGULATING SYSTEM
Filed Feb. 11, 1932    2 Sheets-Sheet 2

Inventor:
George H. Jump,
by Charles V. Mullan
His Attorney.

Patented June 20, 1933

1,915,095

UNITED STATES PATENT OFFICE

GEORGE H. JUMP, OF BUFFALO, NEW YORK, ASSIGNOR TO GENERAL ELECTRIC COMPANY, A CORPORATION OF NEW YORK

REGULATING SYSTEM

Application filed February 11, 1932. Serial No. 592,325.

My invention relates to regulating systems and more particularly to regulating systems which include elements, or apparatus, having inertia characteristics. By inertia characteristics I mean those characteristics of a device which manifest themselves in a time lag when the device goes from one operating condition, or position, to another.

In regulating systems having elements with inertia characteristics certain operating difficulties are often encountered. For example, if the regulated condition, or quantity, is pulsatory, or vibratory, in character, and the amplitude of these pulsations, or vibrations, is so small as to make it unnecessary, or impractical, to eliminate them by regulator action, changes in the mean value of the regulated quantity will often cause intermittent operation of the master control device of the regulator. Due, however, to the inertia characteristics of the regulating system, no regulation or correction of this change in the mean value of the regulated quantity will take place in case the period of the vibrations, or pulsations, of the regulated quantity are less than the time required for the regulating system as a whole to effect a corrective action. Furthermore, if the main control device of the regulator is a contact making element, which is very often the case, this intermittent operation of this device will produce injurious sparking and pitting of the contacts. This difficulty will be aggravated in cases where the control device is subjected to mechanical vibration, which is not infrequently the case where the regulating system is located near large rotating machines. Another difficulty encountered with regulators having inertia characteristics is severe hunting. This results from the fact that, in the nature of things, the control element does not stop a correcting, or regulating, action until substantially 100% correction has been achieved and then, due to the inertia characteristics of the system, additional correction will take place, which it will be necessary to correct in the opposite direction, thereby subjecting the system to continuous periodic operation, or hunting.

In a copending application of Frank T. Coldwell, Serial No. 553,136, filed July 25, 1931, and assigned to the assignee of the present application, there is disclosed and broadly claimed an arrangement for minimizing the above noted difficulties in regulating systems of the above mentioned type. In my present application I disclose two modified arrangements of the same general character.

In its broader aspects my invention includes means, which may be referred to as a positive bias means, for insuring that a predetermined amount of regulation, or correction, will take place whenever the control means of a regulating arrangement calls for a regulating operation. It also includes means, which may be referred to as negative bias means, which is so related in strength to the inertia characteristics of the regulating system as a whole that the control device of the regulating arrangement will stop calling for a regulating operation a time before the regulator has completed its regulating operation which is such that the overrunning, or inertia characteristics, of the regulating arrangement substantially complete the regulation. In this manner, an improved regulating operation results in that as the hunting of the system is eliminated it is possible to improve the calibration or sensitivity of the regulating arrangement as a whole, while at the same time avoiding chattering or arcing of the contacts of a control device.

An object of my invention is to provide a new and improved regulating system.

Another object of my invention is to provide means for improving the operation of regulating arrangements possessing inertia characteristics.

Another object of my invention is to minimize contact arcing and hunting in regulators, having inertia characteristics, which are controlled by contact making control devices.

My invention will be better understood from the following description taken in connection with the accompanying drawings and its scope will be pointed out in the appended claims.

Figure 2:
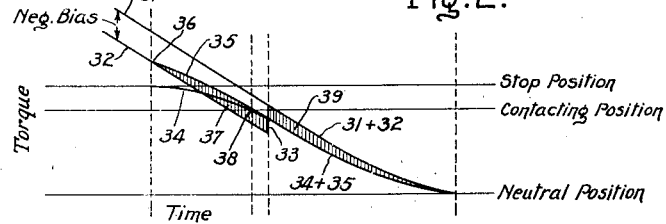
Figure 3:
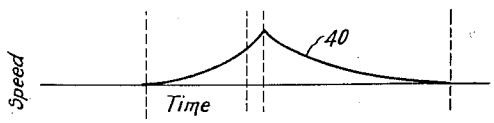
Figure 4:
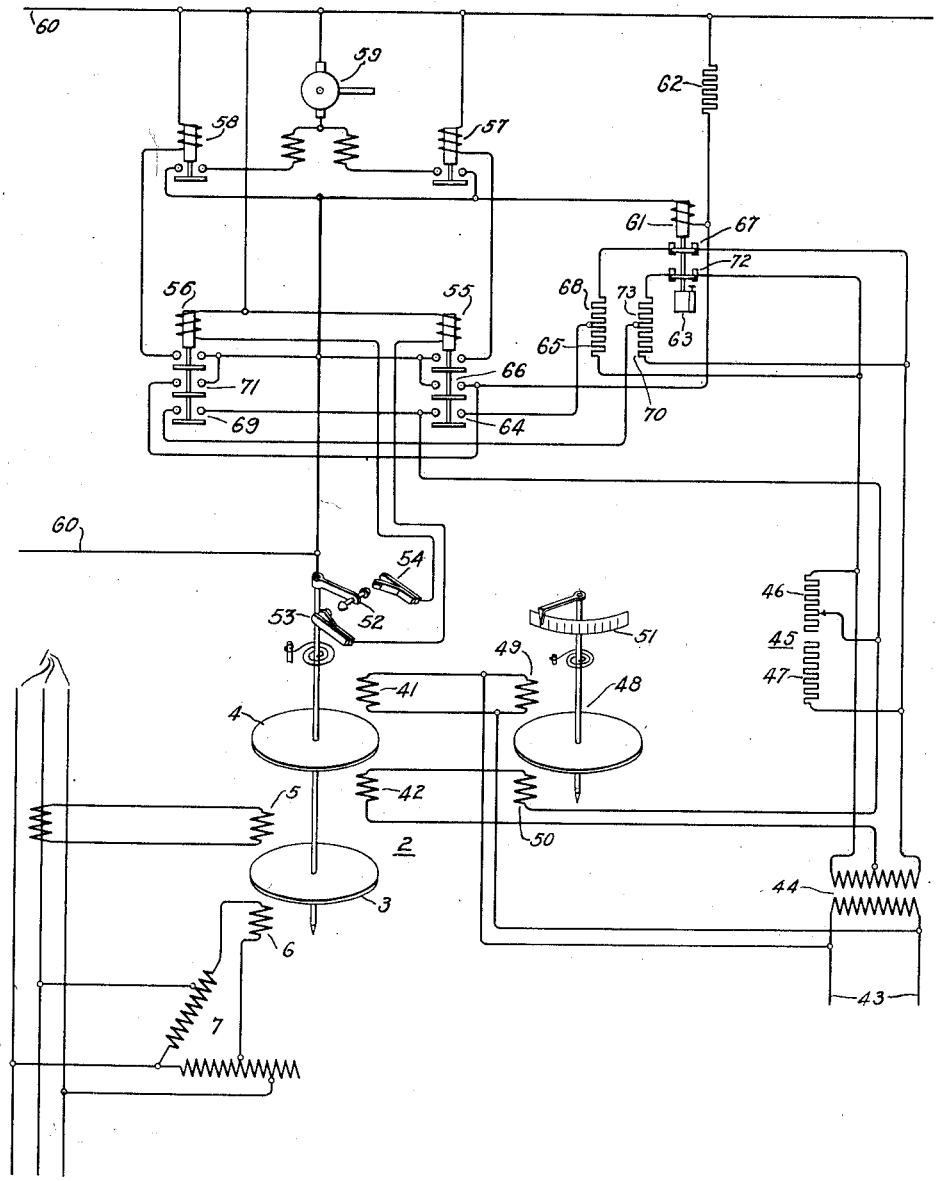

In the drawings, Fig. 1 is a diagrammatic illustration of an embodiment of my invention; Figs. 2 and 3 are curves for illustrating the operation of the arrangement illustrated in Fig. 1; and Fig. 4 is an illustration of a modified arrangement.

Referring now to Fig. 1 of the accompanying drawings, wherein I have illustrated diagrammatically an embodiment of my invention as applied to a regulating system for maintaining substantially constant load on an electric circuit 1, which is illustrated by way of example as a three phase alternating current circuit. Arranged to respond to the power flow in circuit 1 is a control device 2, which may be of any suitable type and which is illustrated as a motor element of an induction disk type wattmeter. As illustrated, the rotor element of the device 2 has two induction disks 3 and 4, so that it may conveniently be the rotor element of a polyphase induction type wattmeter. Instead, however, of employing device 2 as a polyphase wattmeter, which might be done if desired, I employ it as a single phase wattmeter element having a current coil 5 connected to respond to the current in one of the conductors of circuit 1, and a potential coil 6 which is connected across circuit 1 by means of a well known meter type phase shifting transformer 7 which functions to bring the potential applied to coil 6 in phase with the current in winding 5 at unity power factor on circuit 1. In this manner device 2 will produce an operating torque which is proportional to the power flow in circuit 1, provided that the three phase load on this circuit is balanced, which will usually be the case. A spring 8, or other equivalent restraining means, is employed to balance the torque produced by the coils 5 and 6 on the disk 3. A contact element 9 is arranged to be moved by the rotor element of device 2 and this contact element 9 is adapted to engage respectively a resiliently mounted contact 10 and a resiliently mounted contact 11 depending upon the direction of rotation of the rotor element. For convenience, contact 10 will be referred to as the "lower" contact and it will be engaged by the contact 9 when the power flow in circuit 1 exceeds the normal value which it is desired to hold, and consequently it will be the engagement of contacts 9 and 10 which will cause the regulating arrangement to lower the load on circuit 1. Similarly, contact 11 will be referred to as the "raise" contact because engagement of contacts 9 and 11 will be in response to a decrease in load on circuit 1 and will cause the regulating arrangement to increase the load on this circuit.

Under the respective control of contacts 10 and 11 are a pair of relays 12 and 13. Relays 12 and 13 control respectively a pair of contactors 14 and 15 and these contactors in turn control the direction of operation of a pilot motor 16. Motor 16 may be made to control the load on circuit 1 in any one of the usual ways in which a pilot motor is employed as a load varying means. For example, it may control the feed of work to a grinder mechanism thereby varying the power required by this mechanism, or it may shift the brushes on a Scherbius type frequency changer in the way in which the pilot motor 58 controls the load on a frequency changer as is shown in Patent 1,778,599, granted October 14, 1930, in the name of J. I. Hull et al., or it may control the load value of an electrolytic furnace 16', as illustrated. Motor 16 is a series motor having a series field winding 17 and the contactors 14 and 15 are arranged to selectively reverse the connection of the armature of motor 16 with respect to the field winding 17 and connect both of these elements in series across a suitable supply circuit 18.

It will be seen that in such an arrangement there will be a considerable time lag between the closing of the contacts of the control device 2 and any regulating operation because of the inherent time delay caused by the operation of the relays 13 and 15 or relays 12 and 14 together with the inertia characteristics of the motor 16. Similarly, this whole arrangement will have an over-running characteristic because upon disengagement of the contacts of the device 2, it will take a certain time for the various relays and contactors to drop out and also for the motor to come to rest because of its inertia.

In order to improve the operation of a regulating arrangement of the type thus far described, I provide magnets 19 and 20 for producing certain bias effects on the control device 2. Suitable armature means 21, which may be separate elements as illustrated, or which may be a single element if desired, are arranged to be moved by disk 4 and are so arranged that under normal conditions they are equally spaced from the magnets 19 and 20. Bias magnets 19 and 20 are jointly controlled by the contacts of device 2 and a relay 22 having time delay drop-out characteristics. This relay is normally energized to its circuit closing position and, as shown, it is permanently connected across the supply circuit 18 through a suitable current limiting resistor 23. Relay 22 may be of any well known type of time delay drop-out relay and as illustrated, I have shown a dashpot 24 for providing a time delay effect.

In operation, the "lower" contact 10, when engaged by contact 9 in response to a rise in load above normal, completes the circuit for relay 12 whose upper contacts close, thereby energizing relay 14 and causing pilot motor 6 to make the proper correction. In a similar manner, when "raise" contact 11 is engaged, relay 13 will be actuated and the closing of its upper contacts will complete an energizing circuit for contactor 15 thereby reversing the operation of motor 16 and causing a regulating action in the reverse direction. As has been pointed out above, such operation is often accompanied by contact sparking and hunting action.

The action of magnets 19 and 20, and relay 22, for preventing and eliminating these operating difficulties will now be described. Assume that supply circuit 18 is energized and that consequently relay 22 is in its closed position. If now contacts 9 and 10 engage the circuit will be completed from the upper conductor of circuit 18 through conductor 25, the contacts 9 and 10, the operating winding of relay 12, through conductor 26, the magnet 20 and back to the other side of circuit 18 through conductor 27. At the same time a circuit will be completed through the contacts of relay 22, conductor 28, the magnet 19 and back to the supply circuit through conductor 27. Consequently both magnets 19 and 20 will be energized. However, due to the fact that the engagement of contacts 9 and 10 means that the rotor element of device 2 must have rotated a certain angular amount, the armature means 21 will be closer to magnet 19 than to magnet 20 and consequently the pull of magnet 19 on the armature means will be stronger than the pull of magnet 20 on this armature means and consequently there will be a relatively strong positive bias effect tending to hold contacts 9 and 10 in engagement and thereby eliminate any chattering and sparking at the contacts. At the same time that relay 12 is energized its lowermost contacts 29 close and these contacts complete a short circuit around the operating winding of relay 22. Consequently, after the predetermined time for which relay 22 is set to drop out this relay will open its contacts thereby breaking the energizing circuit for the magnet 19. Consequently, as magnet 20 is now the only one which is energized the effective bias on the device 2 will be reversed and will be negative and in a direction to open the contacts. From the above operation it will be seen that whenever the contacts of the control device close, a positive bias effect will be applied for a predetermined time, thereby producing a predetermined amount of regulation whenever these contacts come into engagement. The negative bias effect of magnet 20 acts to accelerate the contacts and to cause their disengagement, and the pull of this magnet is so calibrated with respect to the inertia characteristics of the system as a whole, that the contacts will separate before complete regulation has taken place thereby allowing the overrunning characteristics of the system substantially to exactly complete the regulation.

In a similar manner, when the regulator acts to raise the regulated condition the "raise" contact 11 will be engaged by the contact 9, thereby energizing the winding of the relay 13 through the magnet 19 directly and through the magnet 20 by means of the closed contacts of relay 22. In this situation, however, magnet 20 will be the stronger as the armature means 21 will be closest to it and thereby this magnet will be producing the positive bias effect. However, contacts 30 on relay 13 will have short circuited the operating winding of relay 22 so that in a predetermined time this relay drops out thereby deenergizing the magnet 20 with the result that the magnet 19, which is now energized alone, reverses the bias effect on the control device 2 and tends to accelerate the contacts toward their opening position.

In Fig. 2 the action of the negative bias effect, that is to say, the bias effect tending to open the contacts, is illustrated by a set of curves. In this figure, curve 31 represents the power responsive torque of the control device 2, and its slope shows that this torque is being decreased during a "lowering" regulating action. Curve 32 illustrates the net power torque on the control device 2, which differs from the torque represented by curve 31 by the torque produced by the negative bias magnet. At point 33 the negative bias magnet is deenergized through an opening of the contacts of the control device, and consequently the net power torque on the control device, which is represented by curve 32, merges with the actual power torque which is represented by curve 31, so that from this point on these two curves coincide. Curve 34 illustrates the torque of the bias spring 8, which is substantially proportional to the angular displacement of the rotor of device 2, while curve 35 is similar to curve 34 except that it represents an increased torque at its upper part due to the force produced by the spring members of the contacts 10 or 11. Curves 34 and 35 merge into each other at the point 38 where the contacts separate. At point 36 the net power torque of device 2 equals the restraining torque due to the combined action of the spring 8 and the spring contact and thereafter the contacts begin to separate. The shaded area 37 between the curves 32 and 35 indicates the action of the negative bias magnet in accelerating contact 9 toward its normal mid-position. At 38 the contacts open but due to the inevitable time delay in the deenergization of the negative bias magnet, its force does not drop to zero until a slightly later time 33. After this point it will be seen that the power torque on the control device 2, which is illustrated by the combined curves 31 and 32 will be in excess of the bias torque tending to restore the device to its normal position, which is represented by the combined curves 34 and 35. Consequently, the contacts will now be decelerated and by a proper adjustment of the relative strengths of the various torque elements with respect to the inertia characteristics of the system as a whole, the operation may be made such that the contacts will come to rest in substantially the position in which contact 9 is midway between the "lower" and "raise" contacts 10 and 11, respectively. This action of deceleration of the contacts is illustrated by the shaded portion 39.

In Fig. 2 the strength of the negative bias is shown as constant between the time that contact 9 starts to move and point 33. This is not strictly correct for two reasons. The first is that movement of armature means 21 toward the negative bias magnet will change the strength of the negative bias. The second is that between points 38 and 33 the strength of the energization of the negative bias magnet is decreasing. However, as these differences between the illustrated condition and the actual condition are slight, and as they do not affect the principle of operation, they were not illustrated.

The result of the action of Fig. 2 is illustrated in Fig. 3 by curve 40 representing the speed of the contact 9. At the beginning of this curve, which corresponds to the point 36 when the contact 9 starts to move, they will be accelerated through the unbalanced bias force represented by the shaded area 37, and these contacts will attain a maximum speed when the negative bias magnet is de-energized. After this the contact 9 will be decelerated in accordance with the shaded area 39, and the contact 9 will finally come to rest in its midposition.

In the modification illustrated in Fig. 4 a power regulating system which is similar in general character to the power regulating system illustrated in Fig. 1 is shown. The power torque elements of control device 2, for responding to the power flow in circuit 1, are similar to those shown in Fig. 1. However, the torque producing restraining means for opposing the power torque of device 2 differs from that shown in Fig. 1 in that this torque is, with the exception of a centering restraining spring, electro-magnetically applied to disk 4. As shown, this means consists of a wattmeter type potential coil 41 and a wattmeter type current coil 42 which are energized from a suitable source of substantially constant potential alternating current 43. Potential coil 41 is connected across source 43, while current coil 42 is connected to the secondary winding of a transformer 44, energized from source 43, through a suitable adjusting rheostat 45. As shown, current coil 42 is connected to the electrical midpoint of the secondary winding of transformer 44 and the circuit for this coil is completed through an adjustable resistance 46 of rheostat 45. Coils 41 and 42 produce a torque on disk 4 which is proportional to the energy dissipated in resistance 46 and by adjusting this resistance the torque may be varied at will. Rheostat 45 has another resistance 47 connected to the other terminal of the secondary winding of transformer 44 and by completing the circuit of coil 42 through this resistance the relative direction of the current in coil 42 with respect to the potential of coil 41 may be reversed thereby reversing the torque produced by these two coils on the disk 4. This torque is produced in the usual manner in which it is produced in an ordinary single phase induction type wattmeter. As a convenient means of indicating the strength of the restraining bias in the element 2, I provide a single phase induction disk type wattmeter 48 having potential and current coils 49 and 50 connected in parallel and in series respectively, with the coils 41 and 42 of the device 2. A suitable scale 51 is provided for giving a reading of the restraining torque of element 2. Control device 2 has a movable contact 52 and "raise" and "lower" contacts 53 and 54 respectively. The engagement of contact 52 with either contact 53 or contact 54 causes the energization, respectively, of control relays 55 or 56 and by means of the upper set of contacts of each of these relays, contactors 57 or 58 are energized, respectively, thereby to control the operation of a reversible pilot motor 59. As shown, this motor is a series motor having a pair of reversing field windings connected respectively through the contacts 58 and 57 across a suitable source of supply current 60.

The bias effect of the watt-metric type coil arrangement 41—42 is controlled by means of the joint action of the lowermost sets of contacts of the relays 55 and 56 and by a suitable time delayed operating relay 61. The variation in the restraining torque is produced by varying the current in the current coil 42.

The operation of the system as a whole, in so far as its regulating operation is concerned, is similar to the operation in Fig. 1 in that the engagement of contacts 53 or 54 by contact 52 causes, through the operation of the various relays and contactors, the operation of pilot motor 59 to produce a corrective or regulatory action. Relay 61 is permanently connected across supply circuit 60 through a suitable current limiting resistor 62 and the contacts of this relay are arranged to be open when this relay is energized. Suitable time delay means, which may be of any type and which is illustrated as a dashpot 63, is provided to cause a time delay action in the closing of the contacts of relay 61 when it is deenergized.

The operation of the arrangement illustrated in Fig. 4 is as follows: Assume that the supply circuits 43 and 60 are energized and that "raise" contact 53 is engaged by contact 52. When this happens relay 55 is energized and its contacts 64 close, thereby connecting a resistance 65 in parallel with the resistance 46 of the rheostat 45. This increases the current flow through the current winding 42 of the bias means, thereby increasing the bias torque and tending to hold the contacts firmly in engagement. At the same time a pair of contacts 66, on relay 55, close and these contacts short circuit the operating coil of relay 61. After a predetermined time, which depends upon the setting of the time delay means 63, the contacts of relay 61 will close and upon the closing of its uppermost contacts 67 a resistance 68 will be connected through contacts 64 of relay 55, between the right-hand end of the secondary winding of transformer 44 and the coil 42. This has the effect of reducing the net current in coil 42 because the current flowing in resistance 68 is 180 degrees out of phase with respect to the current flowing in resistors 46 and 65 and these out-of-phase currents subtract arithmetically. Therefore, as soon as the contacts of relay 61 close, the bias is reduced. This reduction may be made great enough to cancel the effect of resistance 65 and actually reduce the bias torque so that the contacts start to separate before they would in an ordinary regulating system. As soon, however, as the contacts of control device 2 open relay 55 is deenergized and resistance 68 as well as resistance 65 are removed from the circuit of current coil 42, thereby restoring this bias to its normal value.

In a similar manner, when the "lower" contact 54 is engaged by contact 52, a pair of contacts 69 of relay 56 connect a resistance 70 between the right hand terminal of the secondary winding of the transformer 44 and the current coil 42, thereby weakening the bias effect, which in this operation is tending to open the contacts, with the result that the contacts are held firmly in engagement. A pair of contacts 71 on relay 56 have, simultaneously, short circuited the operating coil of relay 61 so that in a predetermined time this relay drops out, and its other pair of contacts 72 connect a resistance 73 through the contacts 69 of relay 56 in parallel with the resistance 46, thereby reversing the change in bias of the restraining element and increasing its strength with the result that the contacts are urged to an open position by an increased bias torque. As soon as contact 54 is disengaged by contact 52, relay 56 is deenergized, thereby breaking the circuit through resistors 70 and 73 and restoring the bias element to its normal strength.

In this manner, by varying the relative strength of the normal bias, or restraining, means of the control device of the system in opposite directions, the equivalent effect of that produced by the separate bias magnets 19 and 20 of Fig. 1 is produced.

While I have shown and described particular embodiments of my invention, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, a regulator having a control device with a normal position and a circuit controlling position, electrical bias means operative when said device attains its circuit controlling position for holding said device in said position, and means operative after a predetermined time for abruptly reversing the bias of said bias means.

2. In combination, a regulator control device having a normal position and a circuit controlling position, timing means, and reversible electrical bias means for said device under the joint control of said timing means and said device, said bias means operating when said device attains its circuit controlling position for holding said device in said circuit controlling position for a definite time whereupon the bias is abruptly reversed until said device leaves its circuit controlling position.

3. In combination, a regulator having a contact making control device which is responsive to a condition to be regulated, electrical bias means associated with said control device, operating means for causing said bias means to act during the time said device makes contact, and timing means for reversing the effect of said bias means during said time.

4. In combination, a control device having contacts, means for applying a force a predetermined time after the contacts of said device close tending to open the contacts of said device, and means for discontinuing the application of said force when said contacts separate.

5. A regulating system including, in combination, a contact making control device having a contact making position, means operative when said device attains said contact making position for producing a relatively strong bias force for a predetermined time tending to hold said device in said position, and means operative at the expiration of said time for producing a relatively strong bias force in the opposite direction until said device leaves said contact making position.

6. A regulating system having, in combination, a contact making electro-responsive device, a contact arranged to respond to a condition to be regulated, means operative upon the engagement of the contacts of said device for urging said contacts together for a definite predetermined time, and means for applying an opposite force tending to open said contacts between the expiration of said definite predetermined time and the separation of said contacts.

7. In combination, a control device having a movable element with a normal position and a contact making position, magnetic armature means carried by said movable element, a pair of electro-magnets which are substantially equally spaced from said armature means when said armature is in its normal position, means for energizing both of said magnets for a predetermined time when said element assumes its contact making position, and means operative upon the expiration of said time for deenergizing the magnet which is nearest said armature means, and means for deenergizing the other magnet when said element leaves its contact making position.

8. In combination, a contact making control device having a resiliently mounted contact, bias means operative for a predetermined time upon engagement of the contacts of said device for firmly holding said contacts together and thereby flexing the resilient mounting of said resiliently mounted contact, and bias means operative upon the expiration of said time for moving the contacts of said device until the contacts separate.

9. In combination, a pair of contacts, a control device for operating said contacts, said device having means for producing an operating torque and other means for producing a restraining torque, means for modifying the torque of the restraining means in one direction for a predetermined time when said contacts close, and means for modifying the torque of said restraining means in the other direction between the expiration of said predetermined time and the opening of said contacts.

10. In combination, a regulator control device, restraining means therefor in the form of a wattmeter torque element having a current coil and a potential coil, and means for varying the energization of said current coil in a manner to control the magnitude and direction of the torque produced by said restraining means.

11. In combination, a regulator having a contact making control device which is responsive to a condition to be regulated, restraining force producing means for said device having an alternating current coil the phase of whose current determines the direction of said restraining force, and means for energizing said coil with component out-of-phase currents whereby the restraining force of said means may be controlled.

In witness whereof, I have hereunto set my hand.

GEORGE H. JUMP.